Patented May 23, 1939

2,159,930

UNITED STATES PATENT OFFICE 2,159,930

PREPARATION OF LEUCO-INDIGO

Newton Lamb, Saginaw, Mich., assignor to The Dow Chemical Company, Midland, Mich., a corporation of Michigan No Drawing. Application August 7, 1935, Serial No. 35,163

1 Claim. (Cl. 260—323)

This invention relates to improvements in the manufacture of leuco-indigo, otherwise known as indigo white, and has particular regard to a method whereby important economies in the consumption of process materials are obtained, as well as a product of high purity.

In the production of synthetic indigo by the commercial process most widely employed, phenyl glycine is fused with a mixture of sodium hydroxide and potassium hydroxide in the presence of sodamide or of metallic sodium. The fusion mixture is dissolved in water forming a dilute solution of indoxyl containing a large excess of alkali metal hydroxide, in practice from about 10 to as much as 40 moles of alkali to each mole of indoxyl. It is well known that leuco-indigo can be prepared by reacting 2 moles of indoxyl with one mole of indigo in an alkaline solution, for instance according to the equation:

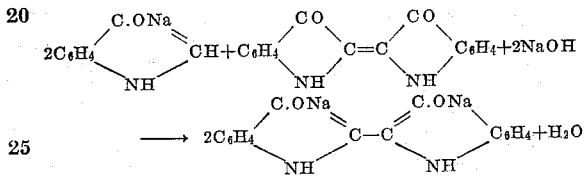

the leuco-indigo being precipitated from the reaction product by acidifying the solution. When it is desired, however, to prepare leuco-indigo by adding indigo to the alkaline solution of indoxyl obtained as aforesaid by dissolving the fusion mixture, the precipitation of leuco-indigo from the reaction mixture in the usual way involves a large consumption of acid to neutralize the great excess of alkali in the solution, as well as the loss of the valuable alkali by conversion into the much less valuable neutral salts. Such loss of alkali is of particular concern in the present case, because the mixed alkali contains a large proportion of potassium hydroxide which it is necessary for economic reasons to recover for reuse in the process. In practice the proportion of KOH by weight in the mixed alkali may vary from as low as 40 per cent to as much as 70 per cent or more.

It is among the objects of the invention to provide a method for separating leuco-indigo from an alkaline solution containing the reaction product of indoxyl and indigo which avoids the necessity for acidifying the solution. Another object is to separate the leuco-indigo in a relatively pure condition. Still another object is to enable the production of leuco-indigo in an economical way, using the mixed alkali solution of the indoxyl fusion mixture as a starting material. Other objects and advantages will appear as the description proceeds. The invention, then, consists in the improved method and novel steps thereof hereinafter fully described and particularly pointed out in the claim.

I have found that the alkali metal salt of leuco-indigo, i. e. di-sodium-leuco-indigo, is substantially insoluble at ordinary or lower temperatures in a solution of sodium hydroxide or of a mixture of sodium and potassium hydroxides, in which the total alkali-metal hydroxide content, calculated as NaOH, is in excess of about 22 per cent. When the salt is crystallized from a sodium hydroxide solution, the sodium salt is obtained. If the crystallization is carried out in a mixed alkali solution, however, the salt product consists principally of the sodium salt, but also apparently contains a small proportion of the potassium salt. Therefore, by concentrating the above mentioned alkaline solution of leuco-indigo to an alkali metal hydroxide content, calculated as NaOH, of 22 per cent or more, the leuco-indigo can be crystallized out substantially completely as the alkali metal salt. The crystals can be separated by filtration from the mother liquor containing the excess of alkali, including most of the potassium hydroxide, which mother liquor may then be concentrated further and returned to the fusion step of the process for producing indoxyl. In this manner the excess of alkali is conserved, and the consumption of acid otherwise required for neutralizing the same is avoided.

I have found further that a purification of the leuco-indigo can be effected coincidentally with its separation from the alkaline mother liquor by conducting the concentration of the alkaline solution in stages, whereby the impurities are precipitated out and separated at a lower alkali concentration than that required to crystallize the alkali metal salt of leuco-indigo. The method, therefore, comprehends crystallizing an alkali metal salt (e. g. the di-sodium salt) of leuco-indigo either from a sodium hydroxide solution of leuco-indigo, or from a solution thereof in an aqueous mixture of sodium and potassium hydroxides. In the latter case the ratio of $$\frac{KOH}{NaOH}$$

is preferably between $$\frac{40}{60}$$

and $$\frac{70}{30}$$

by weight, although the method is not limited thereto. These impurities, such as indoxyl red, indigo brown, desoxy-indigo, or derivatives thereof, etc., are less soluble in alkaline solution than is the salt of leuco-indigo. Hence, a preliminary concentration of the alkaline reaction mixture to an alkali content of less than 22 per cent (calculated as NaOH), e. g. between 15 per cent and 22 per cent thereof, followed by cooling, results in a separation of the impurities, which are filtered off, leaving in the solution a highly pure leuco-indigo salt which can then be crystallized out by further concentration of the solution. The impurities removed by this procedure are those which detrimentally affect or modify the color of the indigo subsequently developed in the dyeing process. The purified leuco-indigo produces a clearer and brighter blue color, when developed in the dyeing process, than the unpurified material.

The following examples are illustrative of suitable ways of carrying out the method of the invention.

Example 1

An alkaline solution of leuco-indigo was prepared by adding the stoichiometric proportion of indigo to a solution of an indoxyl fusion mixture. The resulting solution contained 3 per cent of leuco-indigo and 6 per cent total of mixed sodium and potassium hydroxides, calculated as NaOH. 200 gallons of this solution was evaporated under vacuum at a temperature of about 60° C. or lower to a density at 15°/15° of 1.39 and an alkali hydroxide content (as NaOH) of 27.9 per cent. The concentrated solution was cooled to 10° C. to crystallize out the alkali metal salt of leuco-indigo, and the crystals were filtered from the mother liquor. The recovery of leuco-indigo in the crystal product was 98 per cent.

Example 2

440 gallons of a similar alkaline leuco-indigo solution was taken, which contained 1.25 per cent of leuco-indigo and 7.5 per cent of total alkali, calculated as NaOH. The solution was evaporated under vacuum to an alkali content of 17.2 per cent, cooled to 10° C. and filtered. By this procedure about 8 per cent of the original leuco-indigo content was separated, containing most of the impurities. The filtrate was then evaporated further to a density at 15°/15° of 1.37 and an alkali content (as NaOH) of 28.7 per cent. The concentrated solution was cooled to 10° to crystallize out the salt of leuco-indigo and the crystals were separated by filtration. The recovery of purified leuco-indigo was 99 per cent of that contained in the concentrated solution.

It is advisable to carry out all the steps of the purification as far as possible in an inert atmosphere, such as illuminating gas, methane, hydrogen, nitrogen, etc., to avoid oxidation of the leuco-indigo which would tend to occur on exposure to air.

The preliminary purification of the alkaline leuco-indigo solution, which is carried out in solutions having an alkali concentration (calculated as NaOH) of less than 22 per cent, may be carried out in one stage or in a plurality of stages, in the latter case separating a portion of the impurities at each stage. The exact procedure in any case will depend upon the amount of impurities to be removed, as well as the degree of purity desired in the leuco-indigo product.

The degree of concentration of the alkaline leuco-indigo solution, in order to effect a substantially quantitative separation of the sodium salt of leuco-indigo by crystallization, is, as already stated, such as to give a total alkali concentration in the solution, calculated as NaOH, in excess of 22 per cent. The determination of the alkali content of the solution is made by titrating a measured sample thereof with a standard acid solution (HCl or $H_2SO_4$), which indicates the total alkali present including the 2 moles thereof combined with leuco-indigo. In practice I prefer to carry the concentration of the alkaline leuco-indigo solution to between 25 per cent and 30 per cent total alkali content. A higher degree of concentration may be used, if desired, but there is no practical advantage in carrying it beyond about 30 to 32 per cent. The warm concentrated solution, having a temperature of about 60° C. when the evaporation has been carried out under suitable vacuum, is cooled to room temperature or below to complete the crystallization of the alkali metal salt of leuco-indigo. In practice it is satisfactory to cool to about 10° C., although the cooling may be carried to a lower temperature, if desired. The alkaline mother liquor resulting from the filtration of the leuco-indigo salt contains the excess of alkali in the original solution, including most of the potassium hydroxide therein. This mother liquor may be further concentrated and returned to the process for preparing indoxyl, thus affording a saving of practically all of the excess alkali which otherwise would have been lost by the old procedure of neutralizing the alkaline solution with acid to precipitate leuco-indigo.

The leuco-indigo salt obtained as the immediate product of the process may be employed as such in the indigo dyeing process according to known procedure, or it may be dissolved in water and acidified to liberate the free leuco-indigo, which may be separated by filtration. In such case, of course, only two chemical equivalents of acid are required, whereas in the case of direct acidification of the original alkaline solution containing a large excess of alkali a much larger quantity of acid would be required. The wet filter cake may be creamed into an aqueous paste containing about 20 to 25 per cent of indigo equivalent which can be used directly in the indigo dyeing process, or the latter may be further concentrated by suitable procedure to prepare a more concentrated paste, e. g., containing 40 to 50 per cent of indigo equivalent. Such concentrated paste is desirable in commerce, as it affords a less bulky form of the product for packaging and shipping.

Other modes of applying the principle of my invention may be employed instead of those explained, change being made as regards the method herein disclosed, provided the step or steps stated by the following claim or the equivalent of such stated step or steps be employed.

I therefore particularly point out and distinctly claim as my invention:

The method of preparing leuco-indigo which comprises adding indigo to an aqueous solution of a phenyl-glycine fusion mass containing indoxyl and caustic alkali, concentrating the solution by evaporation under subatmospheric pressure to a total alkali content between about 15 per cent and about 22 per cent, expressed as NaOH, cooling to precipitate a small amount of alkali metal salt of leuco-indigo together with impurities present in the mixture, separating the precipitate, further concentrating the purified solution to a total alkali content in excess of 22 per cent but not greatly exceeding 30 per cent, expressed as NaOH, cooling to room temperature or below to crystallize alkali metal salts of leuco-indigo, and separating the crystals.

NEWTON LAMB.